United States Patent
Park et al.

(10) Patent No.: US 12,509,052 B2
(45) Date of Patent: Dec. 30, 2025

(54) HYBRID ELECTRIC VEHICLE AND ENGINE CLUTCH TOUCHPOINT LEARNING METHOD THEREFOR

(71) Applicants: HYUNDAI MOTOR COMPANY, Seoul (KR); KIA CORPORATION, Seoul (KR)

(72) Inventors: Hyun Jin Park, Busan (KR); Seo Ho Lee, Siheung-si (KR); Jae Young Choi, Seoul (KR); Kwon Chae Chung, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 154 days.

(21) Appl. No.: 18/372,563

(22) Filed: Sep. 25, 2023

(65) Prior Publication Data

US 2024/0286598 A1  Aug. 29, 2024

(30) Foreign Application Priority Data

Feb. 27, 2023  (KR) .................. 10-2023-0025948

(51) Int. Cl.
*B60W 10/08* (2006.01)
*B60W 10/02* (2006.01)

(52) U.S. Cl.
CPC .......... *B60W 10/024* (2020.02); *B60W 10/08* (2013.01); *B60W 2510/0208* (2013.01); *B60W 2510/1075* (2013.01)

(58) Field of Classification Search
None
See application file for complete search history.

(56) References Cited

U.S. PATENT DOCUMENTS

| | | | |
|---|---|---|---|
| 2014/0067174 A1* | 3/2014 | Park | F16H 61/061 |
| | | | 903/902 |
| 2017/0166184 A1* | 6/2017 | Tokura | B60L 15/2054 |
| 2017/0166194 A1* | 6/2017 | Kumazaki | B60K 6/445 |
| 2017/0166196 A1* | 6/2017 | Park | B60W 20/40 |
| 2017/0299053 A1* | 10/2017 | Kobayashi | B60K 6/547 |
| 2019/0009781 A1* | 1/2019 | Segawa | B60W 20/10 |
| 2019/0135103 A1* | 5/2019 | Kuze | B60K 6/543 |
| 2020/0180655 A1 | 6/2020 | Lee et al. | |

(Continued)

FOREIGN PATENT DOCUMENTS

KR  20210118611 A  10/2021

*Primary Examiner* — James M Mcpherson
(74) *Attorney, Agent, or Firm* — Lempia Summerfield Katz LLC

(57) ABSTRACT

In a hybrid electric vehicle and a touchpoint learning method therefor, while a motor is driven, an engagement oil pressure of an engine clutch is adjusted step-by-step, to learn a touchpoint, thereby reducing touchpoint learning time and improving learning accuracy. The touchpoint learning method may include: determining whether a touchpoint learning entry condition previously set is satisfied or not; controlling a first motor connected to one end of an engine clutch to be in a stopped state when the learning entry condition is satisfied; maintaining a second motor connected to the other end of the engine clutch at a preset speed; changing an engagement oil pressure of the engine clutch step-by-step; and learning a touchpoint of the engine clutch based on a torque change of the second motor.

19 Claims, 4 Drawing Sheets

(56) References Cited

U.S. PATENT DOCUMENTS

| | | | |
|---|---|---|---|
| 2020/0298822 A1* | 9/2020 | Miyamoto | B60K 17/356 |
| 2022/0025942 A1* | 1/2022 | Enders | B60W 10/02 |
| 2022/0063586 A1* | 3/2022 | Okamura | B60K 6/365 |
| 2023/0303052 A1* | 9/2023 | Gesang | B60W 20/12 |

* cited by examiner

HYBRID ELECTRIC VEHICLE AND ENGINE CLUTCH TOUCHPOINT LEARNING METHOD THEREFOR

CROSS REFERENCE TO RELATED APPLICATIONS

The present application claims priority to Korean Patent Application No. 10-2023-000025948, filed on Feb. 27, 2023, the entire contents of which are incorporated herein for all purposes by this reference.

TECHNICAL FIELD

The present disclosure relates to a hybrid electric vehicle and a touchpoint learning method therefor wherein, while a motor is driven, an engagement oil pressure of an engine clutch is adjusted step-by-step so that a touchpoint is learned, thereby reducing touchpoint learning time and improving learning accuracy.

BACKGROUND

Recently, as interest in the environment increases, eco-friendly vehicles each equipped with an electric motor as a power source are becoming more popular. Eco-friendly vehicles are also referred to as electrified vehicles, and representative examples include hybrid electric vehicles (HEVs) and electric vehicles (EVs).

Generally, in a hybrid electric vehicle using a parallel-type hybrid powertrain, an engine clutch may be disposed between an engine and a drive motor in order to selectively connect the engine and the drive motor to each other. However, when abrasion occurs due to continuous use of the engine clutch, a touchpoint at which contact between clutch plates is made and a torque begins to be transmitted is gradually changed. Since the change in the touchpoint due to the abrasion usually occurs in the form of a widening gap between the clutch plates, a new touchpoint according to abrasion may be reachable only when a larger engagement oil pressure than the engagement oil pressure corresponding to the previously learned touchpoint is applied.

Normally, an engine clutch touchpoint learning system uses engine power in a parked state.

For example, when learning is performed in a parallel-type powertrain in which an engine is connected to one side of an engine clutch and a drive motor is connected to the other side of the engine clutch, a method of detecting a torque change, which is generated in the drive motor at a time of reaching a touchpoint, may be used in a case of changing a clutch oil pressure of an engine while driving both of the engine and drive motor at respective speeds different from each other.

However, since engine start-up is accompanied when the touchpoint learning described above is performed, there is a problem in that an off state of an engine is accompanied with forceful engine start-up or there is a problem in that non-driving fuel loss occurs even though the engine is started. In addition, since the learning is performed in an idle state of the engine, there is a problem in that a long time is required until the idle state is stabilized, and thus learning accuracy of the touchpoint is lowered due to irregular signals.

The foregoing is intended merely to aid in understanding the background of the present disclosure. The foregoing is not intended to mean that the present disclosure falls within the purview of the related art that is already known to those having ordinary skill in the art.

SUMMARY

An objective of the present disclosure is to provide a hybrid electric vehicle and a touchpoint learning method therefor wherein the engine clutch touchpoint learning may be performed more rapidly, stably, and accurately without starting an engine.

The technical problems to be achieved in the present disclosure are not limited to the technical problems mentioned above. Other technical problems that are not mentioned herein should be more clearly understood by those having ordinary skill in the art to which the present disclosure belongs from the following description.

According to an embodiment, a touchpoint learning method for a hybrid electric vehicle is provided. The touchpoint learning method includes: determining whether a touchpoint learning entry condition previously set is satisfied or not; controlling a first motor, which is connected to one end of an engine clutch, to be in a stopped state when the learning entry condition is satisfied; maintaining a second motor, which is connected to the other end of the engine clutch, at a preset speed; changing an engagement oil pressure of the engine clutch step-by-step; and learning a touchpoint of the engine clutch based on a torque change of the second motor.

For example, the controlling of the first motor to be in the stopped state may include controlling an engine directly connected to the first motor to be in an off state.

For example, the learning entry condition may include at least one of a shift step condition, a brake state condition, a battery charge state condition, and/or a temperature condition.

For example, maintaining the second motor at the preset speed may include determining whether stabilization is achieved at the preset speed or not. The changing may be performed after the second motor is stabilized at the preset speed.

For example, maintaining the second motor at the preset speed may further include storing a converged torque of the second motor in a state stabilized at the preset speed. Learning the touchpoint may be performed based on the stored torque of the second motor and the current torque of the second motor.

For example, learning the touchpoint may include comparing a preset reference value with a difference between the stored torque of the second motor and the current torque.

For example, learning the touchpoint may include determining, as the touchpoint, an engagement oil pressure corresponding to a current step when the difference is greater than the reference value as a result of the comparison.

For example, changing the engagement oil pressure may include performing a change in order from a step of low engagement oil pressure to a step of high engagement oil pressure among a plurality of preset oil pressure steps having a predetermined oil pressure difference therebetween.

For example, changing the engagement oil pressure may include: setting a plurality of steps having a predetermined pressure difference between the previous and next steps based on an engagement oil pressure corresponding to a current touchpoint; and applying the engagement oil pressure step-by-step from a low step among the plurality of set steps.

In addition, according to an embodiment, a hybrid electric vehicle is provided and includes: an engine clutch having one end thereof and another end thereof; a first motor connected to the one end; a second motor connected to the other end; and a control unit. The control unit is configured to learn a touchpoint of the engine clutch based on a torque change of the second motor by controlling the first motor to be in a stopped state when a preset touchpoint learning entry condition is satisfied and by changing an engagement oil pressure of the engine clutch step-by-step in a state of maintaining the second motor at a preset speed.

For example, the hybrid electric vehicle may further include an engine directly connected to the first motor. The control unit may control the engine directly connected to the first motor to be in an off state when the touchpoint learning entry condition previously set is satisfied.

For example, the learning entry condition may include at least one of a shift step condition, a brake state condition, a battery charge state condition, and/or a temperature condition.

For example, the control unit may change the engagement oil pressure step-by-step when the second motor is stabilized at the preset speed.

For example, the control unit may store a converged torque of the second motor in a state where a speed of the second motor is stabilized at the preset speed and may perform learning based on the stored torque of the second motor and a current torque of the second motor.

For example, the control unit may learn the touchpoint by comparing a preset reference value with a difference between the stored torque of the second motor and the current torque.

For example, as a result of the comparison, the control unit may determine, as the touchpoint, an engagement oil pressure corresponding to a current step when the difference is greater than the reference value.

For example, the control unit may perform a change in order from a step of low engagement oil pressure to a step of high engagement oil pressure among a plurality of preset oil pressure steps having a predetermined oil pressure difference therebetween.

For example, the control unit may set a plurality of steps having a predetermined pressure difference between previous and next steps based on an engagement oil pressure corresponding to a current touchpoint and may apply the engagement oil pressure step-by-step from a low step among the plurality of set steps.

According to the hybrid electric vehicle and the touchpoint learning method therefor of the present disclosure, the engine clutch touchpoint learning is enabled through starting of the drive motor while the engine is in an off state.

Therefore, fuel consumption for the touchpoint learning does not occur and there is less noise and vibration.

In addition, since a speed stabilization time required during engine startup is not needed, rapid learning compared to a method involving engine startup is enabled. As a result, there is less burden in increasing learning frequency.

The effects of the present disclosure are not limited to the above-mentioned effects. Other effects that are not mentioned herein should be more clearly understood by those having ordinary skill in the art from the following description.

BRIEF DESCRIPTION OF THE DRAWINGS

In order that the disclosure may be well understood, various forms thereof are described herein, given by way of example, reference being made to the accompanying drawings.

DETAILED DESCRIPTION

Figure 1:
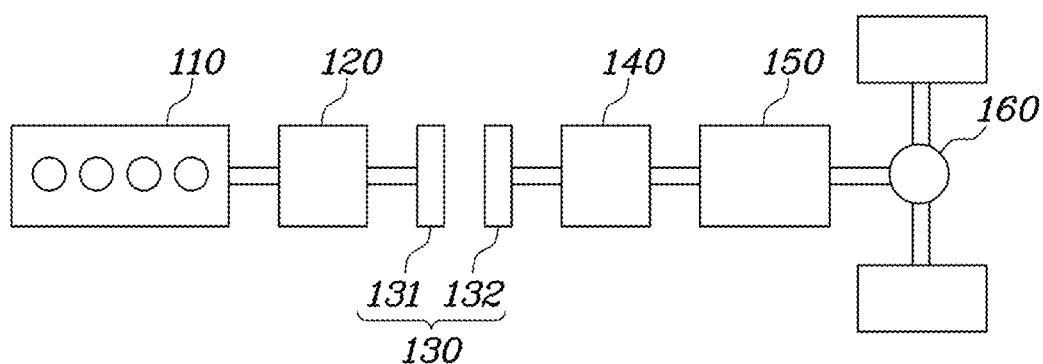
FIG. 1 is a view illustrating an example of a powertrain configuration of a hybrid electric vehicle according to an embodiment of the present disclosure.

Hereinafter, embodiments disclosed in the present specification are described in detail with reference to the accompanying drawings. Regardless of the reference numerals, identical or similar components are given by the same reference numbers, and the overlapping description thereof has been omitted. The words "module" and "part/unit" used as noun suffixes for the components used in the following description are given or mixed in consideration of only the ease of writing the specification. Such words do not have distinct meanings or roles by themselves. In describing embodiments disclosed in the present specification, where it has been determined that a detailed description of a related known technology may obscure the subject matter of embodiments disclosed in the present specification, the detailed description thereof has been omitted. In addition, the accompanying drawings are only to help understand the embodiments disclosed in the present specification and the technical idea disclosed in the present specification is not limited by the accompanying drawings. Also, it should be understood that the accompanying drawings include all changes, equivalents, or substitutes, which are included in the spirit and technical scope of the present disclosure.

It should be understood that, although the terms including ordinal numbers, such as first, second, and the like, may be used herein to describe various elements, these elements should not be limited by these terms. These terms are only used for the purpose of distinguishing one component from another component.

It should be understood that, when a component is referred to as being "coupled" or "connected" to another component, the component can be directly coupled or connected to the other component or intervening components may be present. In contrast, when a component is described as being "directly connected", "directly coupled", or "directly linked" to another component, it should be understood that there are no intervening components present therebetween.

As used herein, the singular forms are intended to include the plural forms as well, unless the context clearly indicates otherwise. When a component, device, element, or the like, of the present disclosure, is described as having a purpose or performing an operation, function, or the like, the component, device, or element should be considered herein as being "configured to" meet that purpose or to perform that operation or function.

It should be further understood that the terms "comprise", "include", "have", and the like, when used in the present specification, specify the presence of stated features, integers, steps, operations, elements, components, and/or combinations thereof. However, such terms do not preclude the presence or addition of one or more other features, integers, steps, operations, elements, components, and/or combinations thereof.

In addition, a unit or control unit included in names such as a motor control unit (MCU) and a hybrid control unit (HCU) is just a term widely used for naming of a controller that controls vehicle-specific functions and does not mean a generic function unit. For example, each controller may include: a communication device for communicating with other controllers or sensors in order to control functions in charge; a memory for storing an operating system, logic instructions, and input/output information; and one or more processors for performing determinations, calculations, and decisions, which are required for controlling the functions in charge.

Before describing an engine clutch touchpoint learning method according to embodiments of the present disclosure, a structure and control system of a hybrid electric vehicle applicable to the disclosed embodiments are first described.

FIG. 1 is a view illustrating an example of a powertrain configuration of a hybrid electric vehicle according to an embodiment of the present disclosure.

Referring to FIG. 1, the powertrain of the hybrid electric vehicle is illustrated employs a parallel-type hybrid system equipped with two motors 120 and 140 and an engine clutch 130 between an Internal Combustion Engine (ICE) 110 and a transmission 150. Such a parallel-type hybrid system is also referred to as a Transmission Mounted Electric Drive (TMED) hybrid system because the motor 140 is connected to an input terminal of the transmission 150 at all times.

A first motor 120 of the two motors 120 and 140 is disposed between the engine 110 and one end of the engine clutch 130. An engine shaft of the engine 110 and a first motor shaft of the first motor 120 are directly connected to each other and able to rotate together at all times.

The second motor 140 has a greater output than that of the first motor 120, and the second motor 140 may serve as a drive motor. In addition, the first motor 120 may perform a function of a starting motor for cranking the engine 110 when to start the engine 110, recover rotation energy of the engine 110 through power generation when the engine is off, and perform the power generation with power of the engine 110 in a state where the engine 110 is starting.

In the hybrid electric vehicle having the powertrain as shown in FIG. 1, when a driver steps on an accelerator pedal after starting the engine (e.g., HEV Ready), the second motor 140 is driven first by using electric power from a battery (not shown) in a state where the engine clutch 130 is opened. Accordingly, the power of the second motor 140 passes through the transmission 150 and a final drive (FD) 160, whereby wheels move (i.e., an EV mode). When a greater driving force is required as the vehicle accelerates slowly, the first motor 120 may operate to crank the engine 110.

After the engine 110 is started, when a rotational speed difference between the engine 110 and the second motor 140 is within a predetermined range, the engine clutch 130 is only then engaged, and the engine 110 and the second motor 140 rotate together (i.e., a transition from the EV mode to a HEV mode). Accordingly, while passing through a torque blending process, a driver's requested torque may be satisfied as the power of the second motor 140 decreases and the power of the engine 110 increases. In the HEV mode, the engine 110 may satisfy most of the requested torque, and a difference between an engine torque and the requested torque may be compensated by at least one of the first motor 120 and the second motor 140. For example, in a case where the engine 110 outputs a torque higher than the required torque in consideration of efficiency of the engine 110, the first motor 120 or the second motor 140 generates power as much as a surplus engine torque. In a case where the engine torque is less than the required torque, at least one of the first motor 120 and the second motor 140 may output a torque corresponding to the insufficient portion of the engine torque.

When a predetermined engine-off condition, such as deceleration of the vehicle, is satisfied, the engine clutch 130 is opened and the engine 110 is stopped (i.e., a transition from the HEV mode to the EV mode). During deceleration, the battery is charged through the second motor 140 by using the driving force of the wheels, i.e. by braking energy regeneration or regenerative braking.

In general, as for the transmission 150, a steptronic transmission or a multi-plate clutch, for example, a Dual Clutch Transmission (DCT), may be used.

Figure 2:
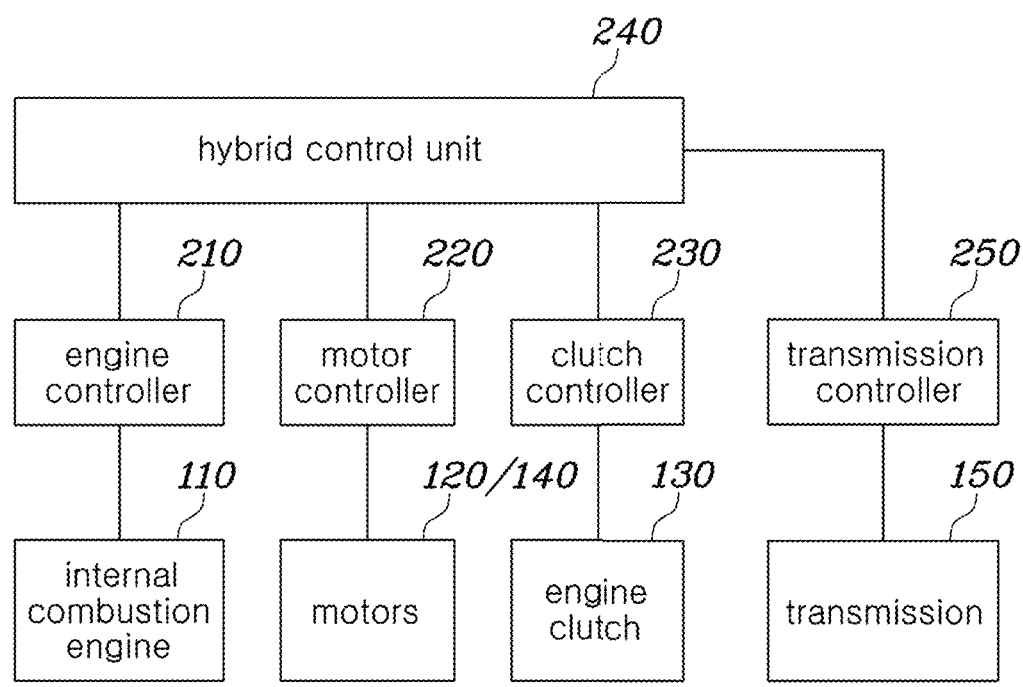
FIG. 2 is a view illustrating an example of a control system configuration of a hybrid electric vehicle according to an embodiment of the present disclosure.

FIG. 2 is a view illustrating an example of a configuration of a control system of the hybrid electric vehicle according to an embodiment of the present disclosure.

Referring to FIG. 2, in the hybrid electric vehicle to which embodiments of the present disclosure can be applied, an internal combustion engine 110 may be controlled by an engine controller 210. Torques of the first motor 120 and second motor 140 may be controlled by a motor controller (MCU) 220 and the engine clutch 130 may be controlled by a clutch controller 230, respectively. The engine controller 210 may also be referred to as an engine management system (EMS). In addition, a transmission controller 250 controls the transmission 150.

The motor controller 220 may control a gate drive unit (not shown) with a pulse width modulation (PWM) type control signal based on a motor angle, a phase voltage, a phase current, a required torque, and the like of each of the motors 120 and 140. Accordingly, the gate drive unit may control an inverter (not shown) for driving each of the motors 120 and 140.

Each controller is connected to a hybrid control unit (HCU) 240 as an upper controller that controls the entire powertrain including a mode conversion process. Under the control of the hybrid control unit 240, each controller may provide information required for engine clutch control when changing a driving mode and shifting gears and/or information required for engine stop control, or may perform an operation according to a control signal.

For example, the hybrid control unit 240 determines whether to perform switching between the EV-HEV modes or switching between charge depleting-charge sustaining (CD-CS) modes (in a case of a PHEV) according to a driving state of a vehicle. To this end, the hybrid control unit determines timing when the engine clutch 130 is released (i.e., an Open state), and performs oil control when the engine clutch 130 is released. In addition, the hybrid control unit 240 may determine states (i.e., Lock-up, Slip, Open, and the like) of the engine clutch 130 and control timing of fuel injection stop of the engine 110. In addition, the hybrid control unit may control engine rotation energy recovery by transmitting a torque command for controlling the torque of the first motor 120 to the motor controller 220 in order to control engine stop. In addition, the hybrid control unit 240 may determine a state of each of the driving sources 110, 120, and 140 in order to satisfy a required torque, determine a required driving force to be shared by each of the driving sources 110, 120, and 140 accordingly, and transmit torque commands to the controllers 210 and 220 that control respective driving sources.

It should be apparent to those having ordinary skill in the art that the above-described connection relationship between controllers and functions/classifications of each controller are examples and are not limited to their names as well. For example, the hybrid control unit 240 may be implemented so that a corresponding function is replaced and provided in any one of the other controllers other than the hybrid control unit 240, or a corresponding function may be distributed and provided in two or more of the other controllers.

The configurations of FIGS. 1 and 2 described above are only examples of configurations of hybrid electric vehicles. It should be apparent to those having ordinary skill in the art that the hybrid electric vehicles applicable to embodiments are not limited to such structures.

In an embodiment of the present disclosure, it is proposed that learning is enabled even when the engine 110 of the vehicle is in an off state by way of learning a touchpoint through driving of the second motor 140 of the hybrid electric vehicle.

As shown in FIG. 1, the engine clutch 130 may include a first clutch end 131 connected to a first shaft and a second clutch end 132 connected to a second shaft. The first shaft may refer to a shaft connected to the engine 110 and the first motor 120, and the second shaft may refer to a shaft connected to the second motor 140 and the transmission 150. A point at which contact between both clutch ends 131 and 132 starts to occur as one clutch end moves toward the other clutch end by an engagement oil pressure. A torque of the first shaft thereby starts to be transmitted to the second shaft, which is referred to as a touchpoint or a kiss point. For example, the first clutch end 131 may move toward the second clutch end 132 side by the engagement oil pressure. Depending on implementation, it is natural that the second clutch end 132 may move toward the first clutch end 131 side by an engagement oil pressure.

In general, touchpoint learning in a hybrid electric vehicle may be initially performed at an End of Line (EOL) stage of vehicle mass production inspection and may be performed during the operation of the hybrid electric vehicle after customer delivery of the vehicle.

The touchpoint learning may be performed when a touchpoint learning entry condition, which has been previously set, is satisfied. The touchpoint learning entry condition may include one or a plurality of conditions and, in a case of the plurality of conditions, the touchpoint learning may be performed when all the conditions are satisfied.

Such a touchpoint learning entry condition is given to eliminate disturbance as much as possible during the touchpoint learning so that accurate learning is achieved.

The touchpoint learning entry condition may include at least one of a transmission state condition, a brake state condition, a battery charge state condition, an Automatic Transmission Fluid (ATF) temperature (i.e., an oil temperature inside a gearbox), a clutch temperature condition, a mileage, or a battery state, or any combination thereof.

For example, a touchpoint learning entry condition may be satisfied in the following cases. One case may include a park (P) gear in a transmission state condition. Another case may be of an off state in a break state condition. Yet another case may be an AFT temperature condition where an ATF temperature is greater than or equal to a preset minimum temperature (e.g., 10 degrees Celsius). Still another case may be where a clutch temperature is within a preset range (e.g., 240 to 280 degrees Celsius or less). Another case may be a battery state where a current state of charge (SOC) of a battery is greater than or equal to a preset minimum SOC. Another case may be mileage where a driving distance since the last learning is greater than or equal to a predetermined distance. However, such touchpoint learning entry conditions are examples and are not limited to any condition as long as the touchpoint learning entry condition contributes to the exclusion of external variables during the touchpoint learning.

When the touchpoint learning entry condition as described above is satisfied, the hybrid control unit 240 may control the touchpoint learning to start.

A detailed touchpoint learning process is described with reference to FIGS. 3 and 4 below.

Figure 3:
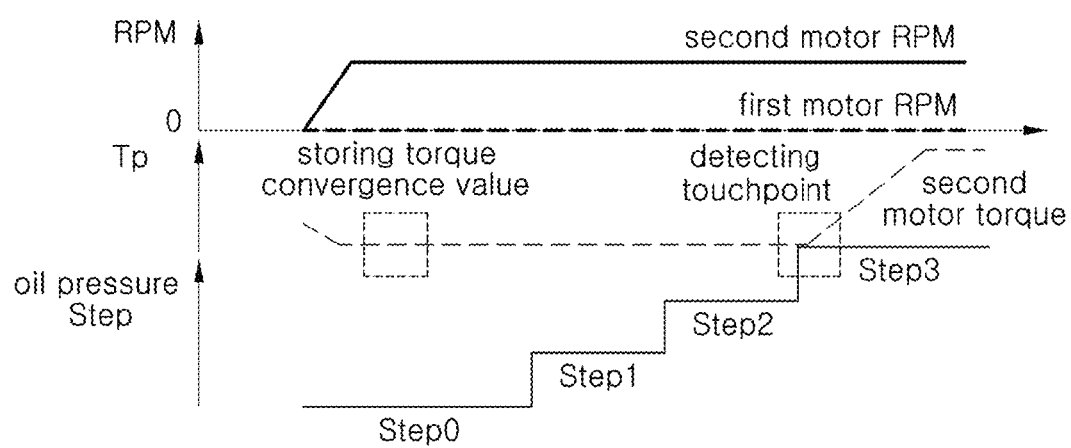
FIG. 3 is a view illustrating an example of a touchpoint learning form according to an embodiment of the present disclosure.

FIG. 3 is a view illustrating an example of a touchpoint learning form according to an embodiment of the present disclosure.

In the graph shown in FIG. 3, the respective vertical axes represent, in order from top to bottom, speeds or rotations per minute (RPM) of the first motor 120 and the second motor 140, a torque of the second motor 140, and oil pressure steps of the engine clutch 130. The horizontal axis represents time being shared by each vertical axis.

Referring to FIG. 3, when learning starts according to a touchpoint learning entry condition that is satisfied, an oil pressure of the engine clutch 130 may be controlled in a state of step 0 (e.g., the oil pressure is not applied) corresponding to full opening, an RPM of the first motor 120 may be maintained at 0 (zero) in an off state of the engine 110, and an RPM of the second motor 140 may be controlled to a predetermined target speed (e.g., 300 RPM). In other words, according to a speed control command of the hybrid control unit 240, the motor controller 120 may control each of the motors 120 and 140 to follow respective target speeds thereof.

When the RPM of the second motor 140 is stabilized at the target speed thereof, a torque convergence value may be stored during the corresponding RPM is maintained. Thereafter, the oil pressure of the engine clutch 130 may be sequentially increased for each of a plurality of steps, which are divided into preset pressure units (e.g., 0.2 bar). An incremental condition of the steps may be such that a torque fluctuation exceeding a predetermined step (e.g., 3 Nm) does not occur in the second motor 140 for a preset time period.

In other words, when a touchpoint is reached, the first clutch end 131 on the first motor 120 side does not rotate, but the second clutch end 132 on the second motor 140 side rotates, so friction between the clutch ends 131 and 132 is generated. Such friction acts as a resistance that hinders the rotation of the second motor 140, so the motor controller 220 increases the torque of the second motor 140 in order to maintain the target speed of the second motor 140. As a result, before reaching the touchpoint, the torque of the second motor 140 is maintained at the torque convergence value when the target speed is stabilized and is increased when reaching the touchpoint.

For example, in the case of FIG. 3, since the torque increases when the clutch oil pressure of the engine reaches step 3, a touchpoint oil pressure may be learned as an oil pressure corresponding to step 3.

Figure 4:
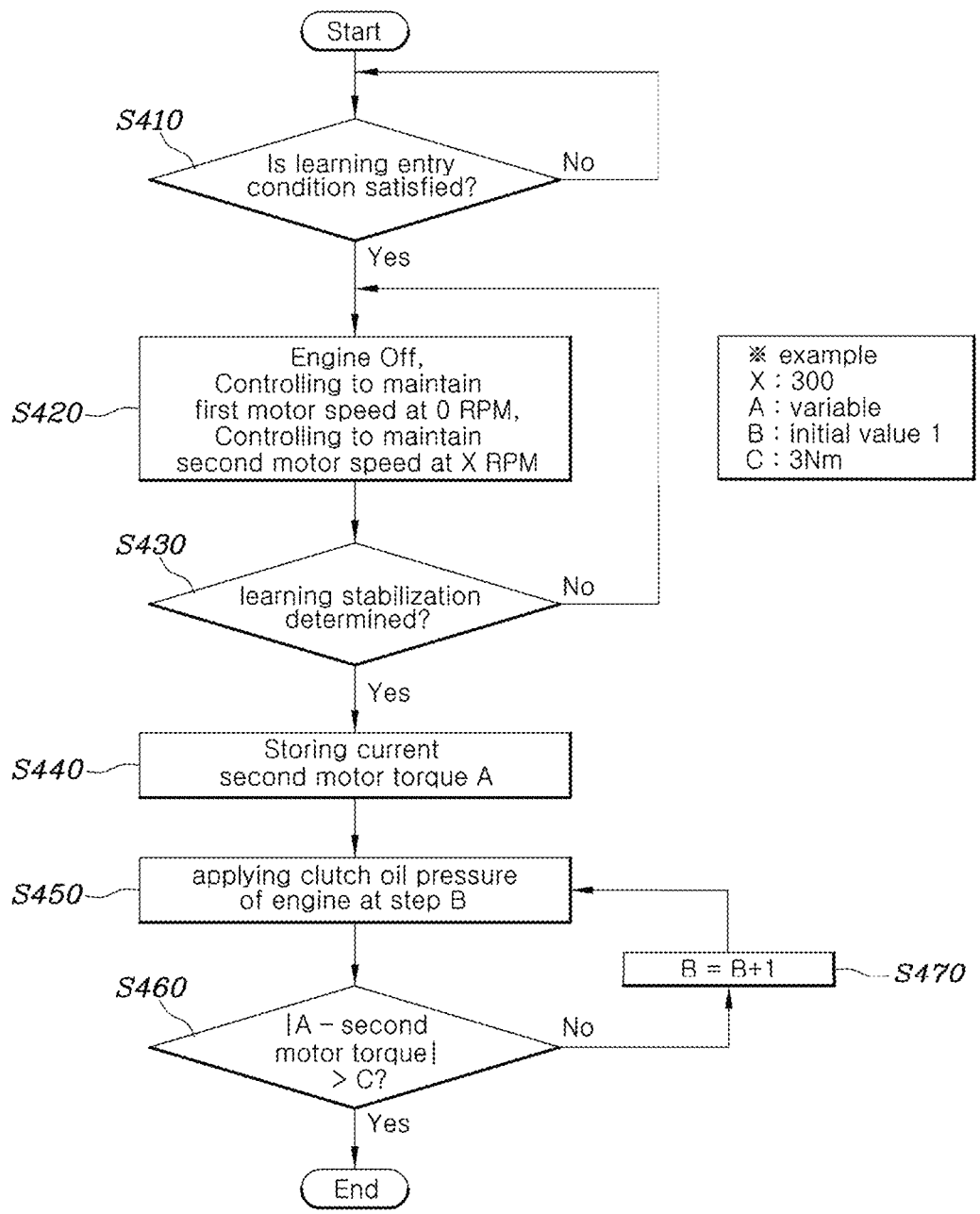
FIG. 4 is a flowchart illustrating an example of a touchpoint learning method for a hybrid electric vehicle according to an embodiment of the present disclosure.

According to an embodiment, FIG. 4 is a flowchart illustrating an example of a touchpoint learning method for the hybrid electric vehicle according to an embodiment of the present disclosure.

Referring to FIG. 4, in step S410, a hybrid control unit 240 may first determine whether a learning entry condition is satisfied. Since the composition of the detailed conditions is the same as described above, duplicate descriptions have been omitted.

When the learning entry condition is satisfied (i.e., Yes in step S410), the hybrid control unit 240 may perform control, in step S420, such that an engine 110 is maintained in an off state, a first motor 120 is maintained at a speed of 0 RPM, and a second motor 140 is maintained at a preset target speed (X RPM, e.g., 300 RPM).

Thereafter, in step S430, the hybrid control unit 240 may determine whether a speed of a driving source for learning is stabilized or not. For example, the hybrid control unit 240 may determine whether the speed of the second motor 140 is maintained within a preset margin at a target speed for a predetermined period of time or more.

When it is determined that the speed of the driving source is stabilized (i.e., Yes in step S430), the hybrid control unit 240 may perform control to store a torque convergence value A of the second motor 140 in a speed stabilization state in step S440 and apply an oil pressure to the engine clutch 130 in step S450. In this case, the oil pressure applied to the engine clutch 130 may have a value corresponding to step B of a specific oil pressure, and an initial value of step B may be 1. However, this is an example and the method is not necessarily limited thereto. For example, for more rapid learning, the initial value of step B may be a one-step or two-step lower value than that of the last learned step. To this end, the hybrid control unit 240 may set a plurality of steps having a predetermined pressure difference between previous and next steps based on an engagement oil pressure corresponding to a current touchpoint (i.e., the last learned touchpoint).

In step S460, in a situation where an oil pressure is applied to the engine clutch 130, the hybrid control unit 240 may determine whether the touchpoint is reached or not by monitoring a torque fluctuation of the second motor 140. In more detail, the hybrid control unit 240 may determine whether a difference between the prestored torque convergence value A of the second motor 140 at the speed stabilization and the current torque of the second motor is greater than a preset reference torque (e.g., 3 Nm).

When the difference between the torque convergence value A and the current torque of the second motor is less than or equal to the preset reference torque (i.e., No in step S460), this means that the touchpoint is not reached. Thus, the hybrid control unit 240 may increase the clutch oil pressure of the engine by one step in step S470 and may monitor the torque fluctuation of the second motor 140 again in step S460.

When the difference between the torque convergence value A and the current torque of the second motor is greater than the preset reference torque in step S460, this means that the touchpoint has been reached. Thus, the hybrid control unit 240 may determine the touchpoint oil pressure as an oil pressure corresponding to a current step value in step S480 and may end the learning.

The above-described embodiments of the present disclosure may be or include components implemented as computer-readable code in a medium on which a program is recorded. The computer-readable medium includes all types of recording devices in which data readable by a computer system is stored. Examples of the computer-readable medium include a hard disk drive (HDD), a solid-state disk (SSD), a silicon disk drive (SDD), a read-only memory (ROM), a random-access memory (RAM), a compact-disk ROM (CD-ROM), a magnetic tape, a floppy disk, an optical data storage device, and the like. Accordingly, the above detailed description should not be construed as restrictive in all respects but as providing examples. The scope of the present disclosure should be determined by a reasonable interpretation of the appended claims. All modifications within the equivalent scope of the present disclosure are included in the scope of the present disclosure.

What is claimed is:

1. A touchpoint learning method for a hybrid electric vehicle, the touchpoint learning method comprising:
   determining whether a previously set touchpoint learning entry condition is satisfied or not;
   controlling a first motor, which is connected to a first end of an engine clutch, to be in a stopped state when the touchpoint learning entry condition is satisfied;
   maintaining a second motor, which is connected to a second end of the engine clutch, at a preset speed;
   changing an engagement oil pressure of the engine clutch step-by-step; and
   learning a touchpoint of the engine clutch based on a torque change of the second motor,
   wherein the torque change of the second motor corresponds to each step of the engagement oil pressure of the engine clutch.

2. The touchpoint learning method of claim 1, wherein controlling the first motor to be in the stopped state comprises controlling an engine directly connected to the first motor to be in an off state.

3. The touchpoint learning method of claim 1, wherein the touchpoint learning entry condition comprises at least one of a shift step condition, a brake state condition, a battery charge state condition, or a temperature condition, or any combination thereof.

4. The touchpoint learning method of claim 1, wherein maintaining the second motor at the preset speed comprises:
   determining whether stabilization is achieved at the preset speed or not; and
   performing changing the engagement oil pressure after the second motor is stabilized at the preset speed.

5. The touchpoint learning method of claim 4, wherein maintaining the second motor at the preset speed further comprises:
   storing a converged torque of the second motor in a state stabilized at the preset speed; and
   performing learning the touchpoint based on the stored torque of the second motor and a current torque of the second motor.

6. The touchpoint learning method of claim 5, wherein learning the touchpoint comprises:
   comparing a preset reference value with a difference between the stored torque of the second motor and the current torque.

7. The touchpoint learning method of claim 6, wherein learning the touchpoint comprises:
   determining, as the touchpoint, an engagement oil pressure corresponding to a current step when the difference is greater than the reference value as a result of the comparison.

8. The touchpoint learning method of claim 1, wherein changing the engagement oil pressure comprises:
   performing a change in order from a step of a first engagement oil pressure to a step of a second engagement oil pressure, higher than the first engagement oil pressure, among a plurality of preset oil pressure steps having a predetermined oil pressure difference therebetween.

9. The touchpoint learning method of claim 1, wherein changing the engagement oil pressure comprises:

setting a plurality of steps having a predetermined pressure difference between previous and next steps based on an engagement oil pressure corresponding to a current touchpoint; and applying the engagement oil pressure step-by-step from a first step among the plurality of set steps that is lower than one or more of the plurality of set steps.

10. A non-transitory computer-readable recording medium configured to record a program for executing a touchpoint learning method according to claim 1 for a hybrid electric vehicle.

11. A hybrid electric vehicle comprising:
an engine clutch having a first end and a second end;
a first motor connected to the first end;
a second motor connected to the second end; and
a control unit configured to learn a touchpoint of the engine clutch based on a torque change of the second motor by controlling the first motor to be in a stopped state when a preset touchpoint learning entry condition is satisfied and by changing an engagement oil pressure of the engine clutch step-by-step in a state of maintaining the second motor at a preset speed,
wherein the torque change of the second motor corresponds to each step of the engagement oil pressure of the engine clutch.

12. The hybrid electric vehicle of claim 11, further comprising:
an engine directly connected to the first motor,
wherein the control unit is further configured to control the engine directly connected to the first motor to be in an off state when the preset touchpoint learning entry condition is satisfied.

13. The hybrid electric vehicle of claim 11, wherein the preset touchpoint learning entry condition comprises at least one of a shift step condition, a brake state condition, a battery charge state condition, or a temperature condition or any combination thereof.

14. The hybrid electric vehicle of claim 11, wherein the control unit is further configured to change the engagement oil pressure step-by-step when the second motor is stabilized at the preset speed.

15. The hybrid electric vehicle of claim 14, wherein the control unit is further configured to:
store a converged torque of the second motor in a state where a speed of the second motor is stabilized at the preset speed; and
learn the touchpoint based on the stored torque of the second motor and a current torque of the second motor.

16. The hybrid electric vehicle of claim 15, wherein the control unit is further configured to learn the touchpoint by comparing a preset reference value with a difference between the stored torque of the second motor and the current torque.

17. The hybrid electric vehicle of claim 16, wherein, as a result of the comparison, the control unit is further configured to determine, as the touchpoint, an engagement oil pressure corresponding to a current step when the difference is greater than the reference value.

18. The hybrid electric vehicle of claim 11, wherein the control unit is further configured to perform a change in order from a first step of engagement oil pressure to a second step of engagement oil pressure, higher than the first step, among a plurality of preset oil pressure steps having a predetermined oil pressure difference therebetween.

19. The hybrid electric vehicle of claim 11, wherein the control unit is further configured to:
set a plurality of steps having a predetermined pressure difference between previous and next steps based on an engagement oil pressure corresponding to a current touchpoint; and
apply the engagement oil pressure step-by-step from a first step among the plurality of set steps lower than one or more of the plurality of set steps.

* * * * *